United States Patent [19]

Buri et al.

[11] 4,447,184

[45] May 8, 1984

[54] APPARATUS FOR SEALING CONTAINERS

[75] Inventors: Hermann Buri; Beat Karth, both of Kirchberg, Switzerland

[73] Assignee: Nyffeler, Corti AG, Kirchberg, Switzerland

[21] Appl. No.: 420,830

[22] Filed: Sep. 21, 1982

[30] Foreign Application Priority Data

Oct. 13, 1981 [DE] Fed. Rep. of Germany ... 8129904[U]

[51] Int. Cl.³ .............................................. B21D 51/00
[52] U.S. Cl. .......................................... 413/26; 413/2
[58] Field of Search ............................ 413/1, 2, 3, 26; 72/465

[56] References Cited

U.S. PATENT DOCUMENTS

| | | | |
|---|---|---|---|
| 1,854,424 | 4/1932 | Peelle | 413/2 |
| 2,431,114 | 11/1947 | Golding | 226/83 |
| 3,121,944 | 2/1964 | Karau | 72/465 |
| 3,478,553 | 11/1969 | Weglarz | 72/465 |
| 4,373,371 | 2/1983 | Liu | 72/465 |

FOREIGN PATENT DOCUMENTS 737713 8/1969 Belgium .
56-30045 3/1981 Japan ...................................... 413/26

Primary Examiner—Leon Gilden
Attorney, Agent, or Firm—Peter L. Klempay

[57] ABSTRACT

A heatable sealing head comprises a resiliently yielding pressure element and has at least one cup spring. The pressure element serves to transmit pressure and heat to a closure lid insertable between the sealing head and the rim of a container, this lid to be deformed about portions of the container rim. In the relaxed normal position, the sealing head includes a conical contact surface for the closure lid. The contact surface can be resiliently bent back against the pressure of the rim of the container mouth. The metallic closure lid is provided with thermoplastic material on the side facing the container rim. For the purpose of improving the fixing of the closure lid to the container rim, the contact surface of the pressure element projects increasingly radially inward starting from the sealing head.

3 Claims, 2 Drawing Figures

APPARATUS FOR SEALING CONTAINERS

This invention relates to the sealing of containers, and more particularly to apparatus for sealing the mouths of especially glass containers by means of a thin closure lid, especially metallic, which is provided with thermoplastic material on the side facing the container rim, of the type in which a heatable sealing head includes a resiliently yielding pressure element for transmitting pressure and heat to the closure lid insertable between the sealing head and the container rim, for deforming the closure lid about portions of the container rim, having at least one cup spring and, in the relaxed normal position, a conical contact surface for the closure lid, which surface can be resiliently bent back against the pressure of the rim of the container mouth.

Apparatus of this type has already been proposed. It generally comprises a heatable sealing head, to the underside of which there is secured a resiliently yielding element in the form of a pressure element with which the sealing head presses upon the closure lid which has previously been placed on the rim bounding the mouth of the container. By the transmission to the closure lid of pressure forces and of heat via the resiliently yielding pressure element, which particularly includes cup springs, not only is the lid deformed according to the configuration of the container rim, but also the thermoplastic material, representing as it were a coating of the closure lid, is softened, the closure lid being expediently made of aluminum foil. In the prior art apparatus, the pressure element is designed and constructed in such a way that when set upon the closure lid placed on the container rim, it first acts upon the radially outer regions of the lid since the radially outer portions of the cup springs project downwardly the farthest from the sealing head. In the course of increasing pressure transmission, i.e., in the course of the further approach of the sealing head to the closure lid, the radially outer regions of the pressure element are pressed back somewhat towards the sealing head, so that the pressure transmission upon the closure lid and container rim is shifted to such locations as are situated radially within the original points of action of the resiliently yielding pressure element in its relaxed normal position on the closure lid.

It is an object of this invention to provide improved apparatus for sealing containers in which the closure lid is better secured to the container rim than has been possible with prior art apparatus.

To this end, in the apparatus according to the present invention, of the type initially mentioned, the contact surface of the pressure element juts out increasingly radially inward starting from the sealing head.

As a reversal of the prior art design, so to speak, in which the radially outer edge of the pressure element protrudes the farthest axially from the sealing head, the radially inner portions of the pressure element represent the part projecting the farthest axially from the sealing head in the apparatus according to the present invention.

This results in important advantages which were not readily foreseeable.

What is more, however, the heat transmission itself is improved since the pressure element, especially the heat-transmitting portions thereof, particularly cup springs, no longer come in contact with the heatable sealing head radially inwardly but rather radially outwardly. Here, in a further design of the apparatus according to this invention, it is also advantageous if the retaining plate disposed at the radial outer edge of the pressure element, which plate clamps the pressure element against the sealing head, includes a conical supporting surface for the pressure element; this surface can then be additionally used for heat transmission if the retaining plate itself is likewise made of material which is a relatively good conductor of heat. Moreover, localization of heat on the surface of the lid can more easily be avoided.

Finally, it is also very advantageous that with the design according to the present invention, the free portion of the closure lid extending over the container mouth is stretched the first time it is touched by the particularly pre-heated pressure element, so that this taut condition of the closure lid also conveys a more attractive impression.

A preferred embodiment of the invention will now be described in detail with reference to the accompanying drawing, in which.

Figure 1:
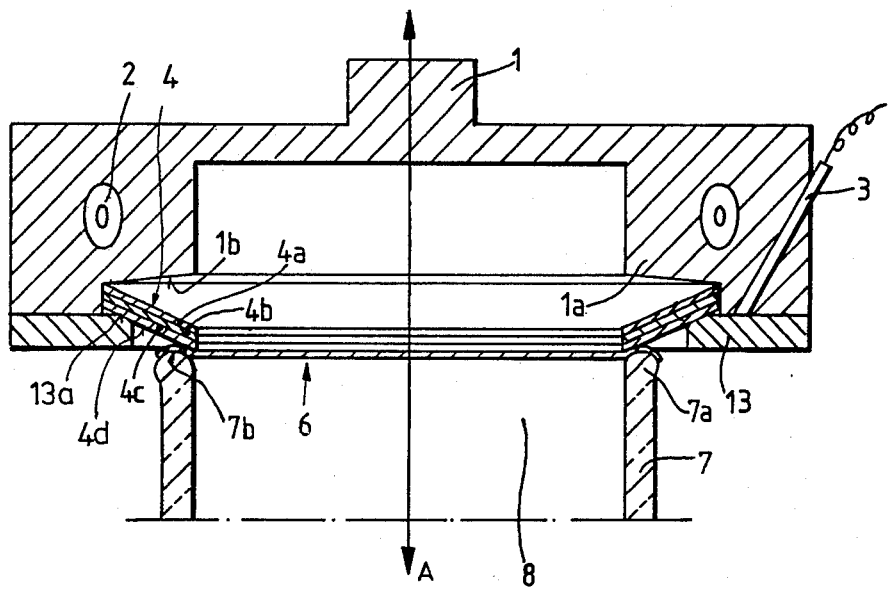
FIG. 1 is a diagrammatic view of the apparatus, partially in section.

FIG. 1 shows a sealing head 1 secured in a holder (not shown) so as to be movable up and down in axial direction A. The sealing head 1 contains a heating element 2 and a temperature sensor 3. On the underside of the sealing head 1, within the heatable portion 1a, there is a recess 1b intended to receive a pressure element 4. For clamping the latter fast, there is a retaining plate 13 which is screwed in a manner not shown to the lower portion 1a of the sealing head 1 and serves to grip or clamp the radially outer edge of the pressure element 4 in the circular recess 1b. The face of the retaining plate 13 towards the springy pressure element 4 is provided with a conical supporting surface 13a which has not only a better, larger-area seat for the pressure element 4 in the relaxed normal position but also the task of ensuring better heat transmission from the sealing head 1 to the pressure element 4. The pressure element 4 consists of several superposed cup springs 4a, 4b, 4c which may, if necessary, be unequally thick or unequally wide in order to exert a preselected development of pressure transmission on the curved rim 7a of a container 7 in the region of the container mouth 8, i.e., upon a closure lid 6 laid thereon, during the course of the movement of the sealing head 1 towards the container mouth 8.

Figure 2:
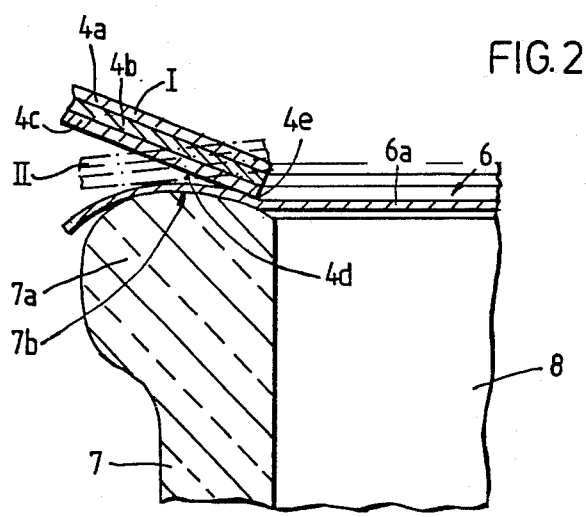
FIG. 2 is a diagrammatic view, on a larger scale, illustrating two phases in the use of the apparatus on a container rim.

In order to seal the container mouth 8, the closure lid 6, particularly still flat in the starting condition and consisting of an aluminum foil 6a with a layer of thermoplastic synthetic material (not shown) applied to the underside, is first laid on the rim 7a of the mouth of the container 7. Then, as illustrated in FIG. 2, the pressure element 4, which is in the relaxed normal position I to begin with, is moved towards the closure lid 6 until the radial inner edge 4e encounters the closure lid 6 and applies the latter, radially within the farthest-protruding portion 7b of the container rim 7a, to the convex outer surface thereof and, in so doing, stretches the portion of the closure lid 6 situated radially within this inner edge 4e, pulling outwardly. Upon further axial movement of the sealing head 1 and the pressure element 4, the latter is forced back out of the normal position I shown in FIG. 2 into the bentback position II. In the course of this movement of the pressure element 4, the closure lid 6 is gradually rolled over the convex outer surface of the container rim 7a, from radially inside to radially outside, by the contact surface 4d of the pressure element 4, until particularly at the moment of the greatest force transmission and most intense heat transmission, the actual "sealing seam" is produced between the thermoplastic coating of the aluminum foil 6a and the container rim 7a made especially of glass.

The free edge of the closure lid 6 still possibly projecting radially outwards may serve as a sort of "gripping edge" for opening the container. There may also be a so-called "tear-open flap" in the closure lid 6; it would be applied to the container rim 7a together with the edge of the lid in the usual manner.

What is claimed is:

1. Apparatus for sealing a thin closure lid, particularly a metallic lid, coated with thermoplastic material to the rim of a container, particularly a glass container, comprising a heatable sealing head and a resiliently yielding pressure element for transmitting pressure and heat to said lid, said pressure element including at least one cup spring and, in the relaxed state thereof, a conical contact surface intended to come in contact with said lid, said contact surface being designed to bend back resiliently upon encountering the resistance of said container rim, said contact surface extending from said sealing head obliquely inward away from said sealing head.

2. The apparatus of claim 1, wherein said pressure element includes a radial outer edge, said sealing head including an annular recess for receiving said outer edge of said pressure element, said apparatus further comprising a retaining plate for holding said outer edge in said recess.

3. The apparatus of claim 2, wherein said retaining plate includes a conical supporting surface for said pressure element and is made of a material having good heat conductivity.

* * * * *